United States Patent
Schneider

[15] 3,677,003
[45] July 18, 1972

[54] AERODYNAMIC TORQUE CONVERTER

[72] Inventor: Raymond C. Schneider, Rockford, Ill.
[73] Assignee: Twin Disc, Incorporated, Racine, Wis.
[22] Filed: Feb. 1, 1971
[21] Appl. No.: 111,277

[52] U.S. Cl. .................................60/54, 60/12, 60/57 T
[51] Int. Cl. ............................F16d 33/00, F16h 41/00
[58] Field of Search .................................60/54, 12, 57 T

[56] References Cited

UNITED STATES PATENTS

| | | | |
|---|---|---|---|
| 2,961,830 | 11/1960 | Dundore et al. | 60/54 |
| 3,105,396 | 10/1963 | Dundore et al. | 60/54 X |
| 3,314,232 | 4/1967 | Hill | 60/12 X |
| 3,500,637 | 3/1970 | Toy | 60/12 X |
| 3,525,213 | 8/1970 | Hill | 60/57 T X |

Primary Examiner—Edgar W. Geoghegan
Attorney—James E. Nilles

[57] ABSTRACT

An aerodynamic torque converter of the fixed housing type and having an impeller, a turbine, and either one or more stages of stators. The aerodynamic torque converter has the exit angles of its impeller blades and of its radial inflow stator blades arranged within certain ranges, to provide a flat horsepower input curve, at constant input rotational speed, for the converter. The torque converter finds particular utility with a prime mover which runs at a constant speed and constant torque, such as a gas turbine. An aerodynamic torque converter of the above type also having continually converging flow path areas in the outer and inner bends of the flow path.

14 Claims, 5 Drawing Figures

AERODYNAMIC TORQUE CONVERTER

BACKGROUND OF THE INVENTION

The invention pertains to aerodynamic torque converter of the type having a fixed housing, an impeller driven by an input shaft, the impeller in turn driving a turbine on the output shaft, and then either one or more stages of stators in the direction of the fluid flow around the circuit of the converter. Aerodynamic torque converters of this type find particular utility in use with gas turbine engines as the prime mover, wherein the gas turbine must operate at a high constant speed and at constant torque.

An example of such a device is shown in the U.S. Pat. No. 3,525,213, which issued Aug. 25, 1970, to C.C. Hill and entitled "Gas Turbine Engine with Aerodynamic Torque Converter Drive." In devices of that character, in order to vary the horsepower, the density of the air is varied. However, such prior art devices have had serious shortcomings because the torque converter itself could not efficiently utilize or absorb the characteristics of such a constant speed and constant torque prime mover. As a result, those prior art devices had efficiency and horsepower input curves which were completely unsatisfactory.

SUMMARY OF THE PRESENT INVENTION

The present invention provides an aerodynamic torque converter having an impeller wheel driven by an input shaft, the impeller wheel in turn driving a turbine wheel connected to the output shaft. In addition, either one or more stages of stators are interposed in the flow path of the fluid between the turbine section and the entry side of the impeller section. The exit angles of the impeller blades and the exit angles of the stator blades located at the radial inflow side of the flow path are arranged within a particular range of angles, which together with the circuit meridional flow areas results in a flat horsepower input curve. The resulting torque converter is therefore particularly suitable for a prime mover which has constant speed and variable torque, and which converter can therefore function to absorb the power from the gas turbine in such a manner as to utilize the characteristics of such a gas turbine to maximum efficiency.

In other words, the density of the gas of the turbine is changed in order to change the horsepower absorbed from the prime mover. The air coming out of the gas turbine to the torque converter is a compressible fluid. Therefore, when the density of air delivered to the present torque converter is varied, the flat horsepower input curve simply moves "up or down" and varies input torque at all speed ratios. The flat horsepower input curve does not become inclined or skewed with changes in speed ratio. Therefore, with the present invention, flat absorption characteristics of the torque converter are provided. The input torque absorption characteristics of the torque converter of the present invention are flat all the way from stall to "run-out" (run-out being zero efficiency at the high end of the curve).

More specifically, the exit angle of the rearwardly incline impeller blades should be from 20° to 45°. The exit angle of the forwardly inclined stator blades located on the radial inflow side should be within the range of 35° to 45°.

Another more limited aspect of the invention relates to an air torque converter of the above type in which the exit angle of the rearwardly inclined turbine blades are arranged at an angle of between 55° and 75°.

The invention also provides an aerodynamic torque converter of the above type in which both the outer and inner, bladeless, bends of the torque converter path are of continually converging cross sectional area. Consequently, the fluid does not separate from known flow path patterns and results in a predictable attack or entrance angle at the stator and at the turbine. As a result of the combination of the above mentioned exit angles of the blades and the continual convergence of the areas of the outer and inner bladeless bends of the converter, a desirable inter-relationship between the actual bladed exit area of each stage is provided. Consequently, an aerodynamic torque converter is provided with (1) has a flat torque absorption characteristic curve at constant speed at all speed ratios and (2) attains higher stall torque ratios.

These and other objects and advantages of the present invention will appear hereinafter as this disclosure progresses, reference being had to the accompanying drawings.

BRIEF DESCRIPTION OF THE DRAWINGS

FIG. 4 is a view similar to FIG. 1, but showing a modified form of torque converter, that is, a single stator stage type torque converter.

DESCRIPTION OF A PREFERRED EMBODIMENT

Figure 1:
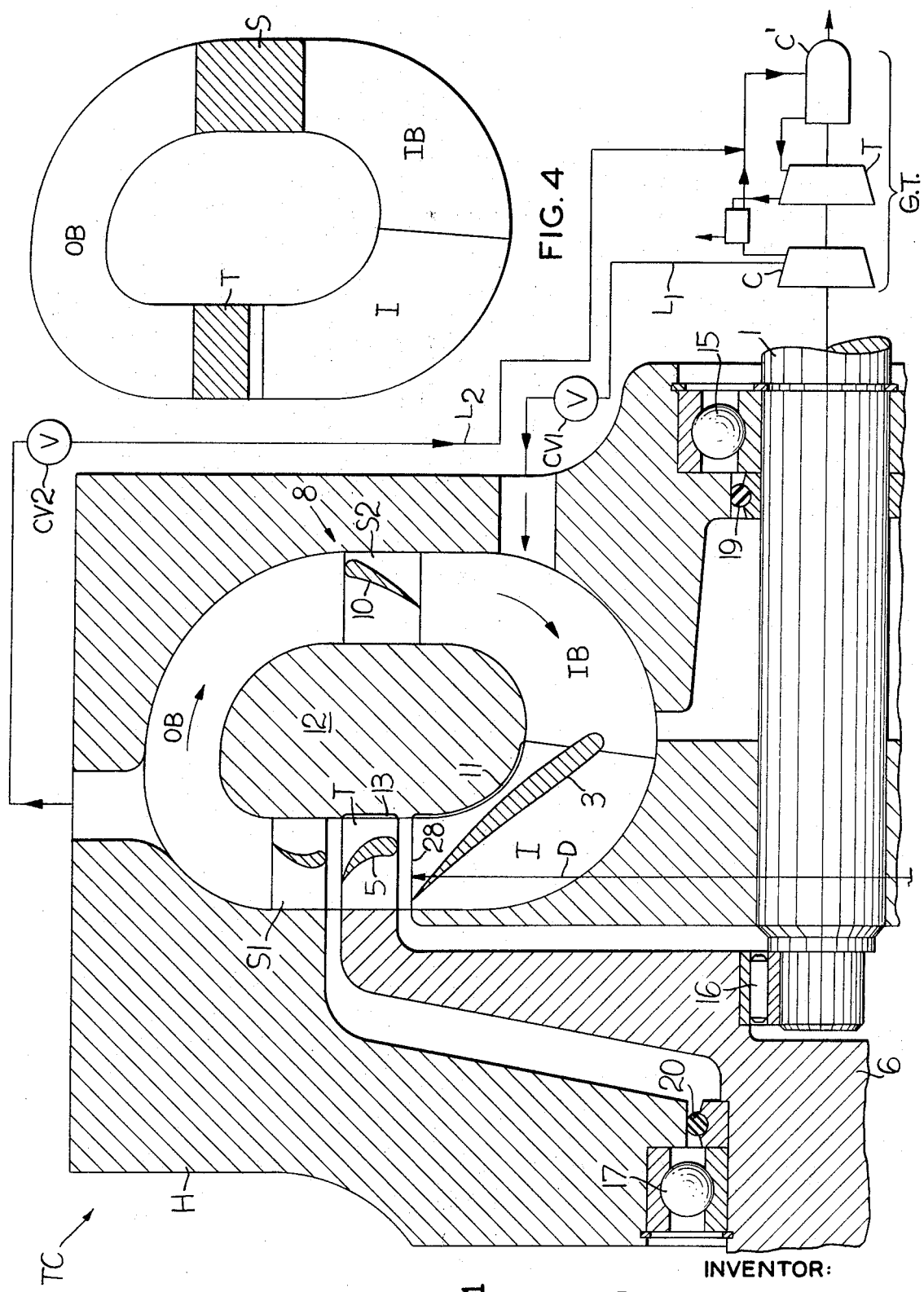
FIG. 1 is a longitudinal, cross sectional view through an aerodynamic torque converter made in accordance with the present invention, and having the cross section of the blades shown superimposed and rotated 90°.
Figure 2:
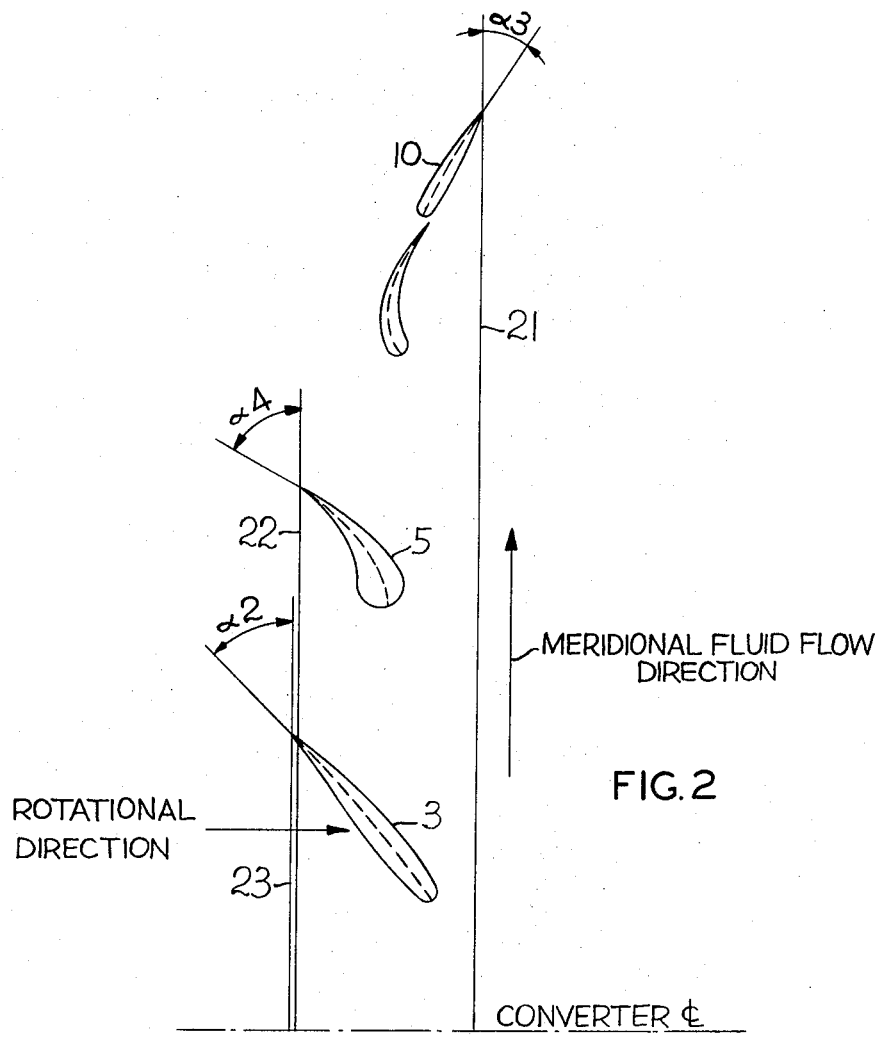
FIG. 2 is a blading diagram for the aerodynamic torque converter shown in FIG. 1.

The aerodynamic torque converter TC shown in FIG. 1 can be driven from a conventional single spool gas turbine GT having a compressor C, a turbine T, a combustor C', and conduit lines L1 and L2 connected to the air torque converter TC. Line L1 connects the compressor C to the inlet of the converter and line L2 connects the high pressure, outer bladeless bend of the converter with the inlet side of the combustor C'. Adjustable valves CV1 and CV2 are also provided, respectively, in conduit lines L1 and L2. The horsepower output of such gas turbine is varied by changing torque at a constant speed, and the turbine drives the input shaft 1 of the torque converter. The impeller I of the torque converter is fixed directly with the input shaft 1 and driven thereby. The impeller includes a series of impeller blades 3, which are of a cross sectional shape as shown in FIG. 2, and also includes a turbine section T having turbine blades 5 which are fixed to the output shaft 6 of the torque converter. The torque converter also includes either a single stator S as shown in FIG. 4, or more stages such as the two stators S1 and S2 shown in FIG. 1. In any arrangement, a stator is located at the radially inflow side 8 of the circuit or flow path of the gas, said path being indicated by the arrows.

The arrangement shown in FIG. 1 is of the split stage type, that is a two stage stator type having a stator section S1 and having a second stator section S2 which is located on the radial inflow side of the circuit. The first stator S1 directly following the turbine on the outflow side does a small amount of turning of the fluid. This type of exit angle design of the first stage therefore presents a small rotational velocity to the outer bladeless area of the circuit and therefore reduces friction losses in the outer bend. The second stator S2 completes the turning in the reaction stage and fixes impeller inlet conditions at a point rather close to the the actual impeller inlet thereby providing better control of the impeller inlet conditions.

The torque converter is of the type having a fixed housing H to which the stator blades 10 are fixed. Thus, the housing, and the stator sections are stationary. The impeller section is driven by the input shaft and the turbine section drives the output shaft. A small clearance 11 is provided between the central core ring portion 12 of the housing and a small clearance 13 is also provided between the inner end of the turbine blades and the central core ring portion 12 of the housing.

The input shaft is mounted on anti-friction ball bearing assembly 15 in the housing and is also piloted at its inner end in the conventional needle bearing assembly 16 which is mounted in the end of the output shaft 6. The output shaft 6 is journalled in the anti-friction, ball bearing assembly 17 in the housing. Suitable and conventional pressure seals, 19 and 20 are also provided.

Referring to FIG. 2, the mean camber line of the blades is shown as a dotted line extending through their mid-section, and this line extends from the exit end of the blades. It will also be noted that lines 21, 22 and 23 extend from the center-line of the torque converter, are perpendicular to the converter center-line axis, and extend through the exit end of the blades intersecting the mean chamber line. The exit angle $\alpha$ of a blade is the angle between its mean camber line and this radial line drawn from the centerline of the torque converter.

Figure 3:
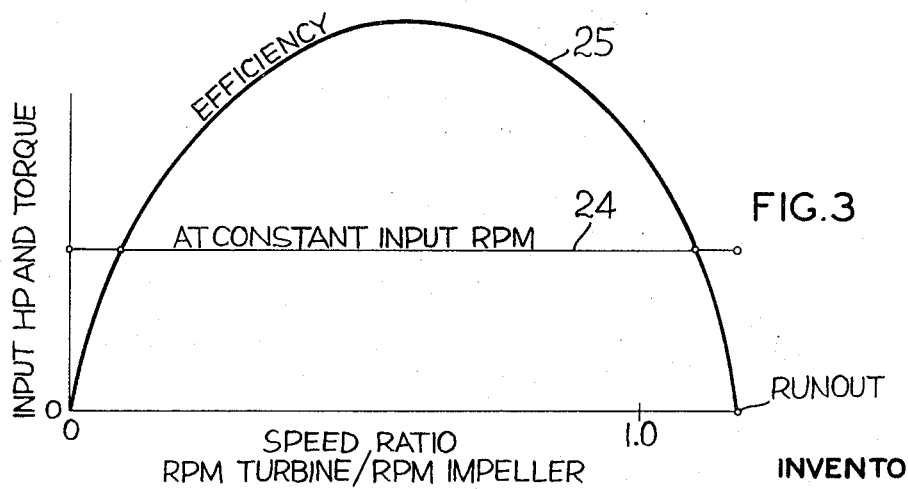
FIG. 3 is a horsepower input and efficiency diagram for the torque converter of the present invention.

I have found that making the exit angles of the impeller blades and those stator blades which are located on the radial inflow side of the circuit within a particular range, that a very flat input torque curve and therefore input horsepower curve are obtained, as shown in FIG. 3. This is particularly desirable to permit the aerodynamic torque converter to function as an absorption device that utilizes the characteristics of a gas turbine as the prime mover to the greatest possible degree. In other words, the horsepower output of the gas turbine varies because of altitude, temperature or because lesser power is desired for a particular operation.

By having the blades made in accordance with the present invention, the horsepower input curve 24 (FIG. 3) of the torque converter is not only flat, but can be varied in different magnitudes of torque (at a constant speed) at any speed ratio simply by density change. This is particularly desirable and results in an efficiency curve 25 as shown on the graph.

Generally, regarding the direction in which the blades are inclined, if an impeller blade is inclined in a radially outward direction and the same forward direction as the direction of wheel rotation, this is referred to in this art as a forward bent blade, that is, it has a forward exit angle.

Conversely, if the blade is inclined radially outwardly and opposite to the direction of rotation of the wheel, it is referred to as a backward bent blade, that is, the blade has a backward exit angle.

More particularly, I have found that the exit angle $\alpha 2$ of the backward inclined impeller blades 3 should be within the range of 20° to 45°. I have also found that the exit angle $\alpha 3$ of the forwardly inclined stator blades 10 that are located on the radial inflow side of the path should be in the range of 35° to 45°. These two ranges of angles are important in order to produce the flat horsepower curve shown in FIG. 3.

The width of the impeller, as at 28, should be 10 to 12 percent of the diameter D of the impeller as measured at the impeller outlet.

I have also found that good results are obtained by having the exit angle $\alpha 4$ of the rearwardly inclined turbine blades 5 in the range of between 55° to 75°. This range of exit angles in the turbine should occur simultaneously with the above mentioned stator and impeller angles.

Referring to FIG. 3, this shows the speed ratio plotted against input torque. That is to say, the speed ratio as defined by the speed of the turbine over the speed of the impeller. The torque absorbed by the impeller of the torque converter from the prime mover at a constant speed is shown. It will be noticed the input horsepower and input torque curve 24 is very flat throughout its range. With the present invention, as the density of the air in the air torque converter is changed, this horsepower curve simply moves up or down along the vertical scale but still remains flat, i.e., horizontal. The resulting efficiency curve 25 is also shown in FIG. 3 and is a particularly desirable curve made possible with the present invention.

Figure 5:
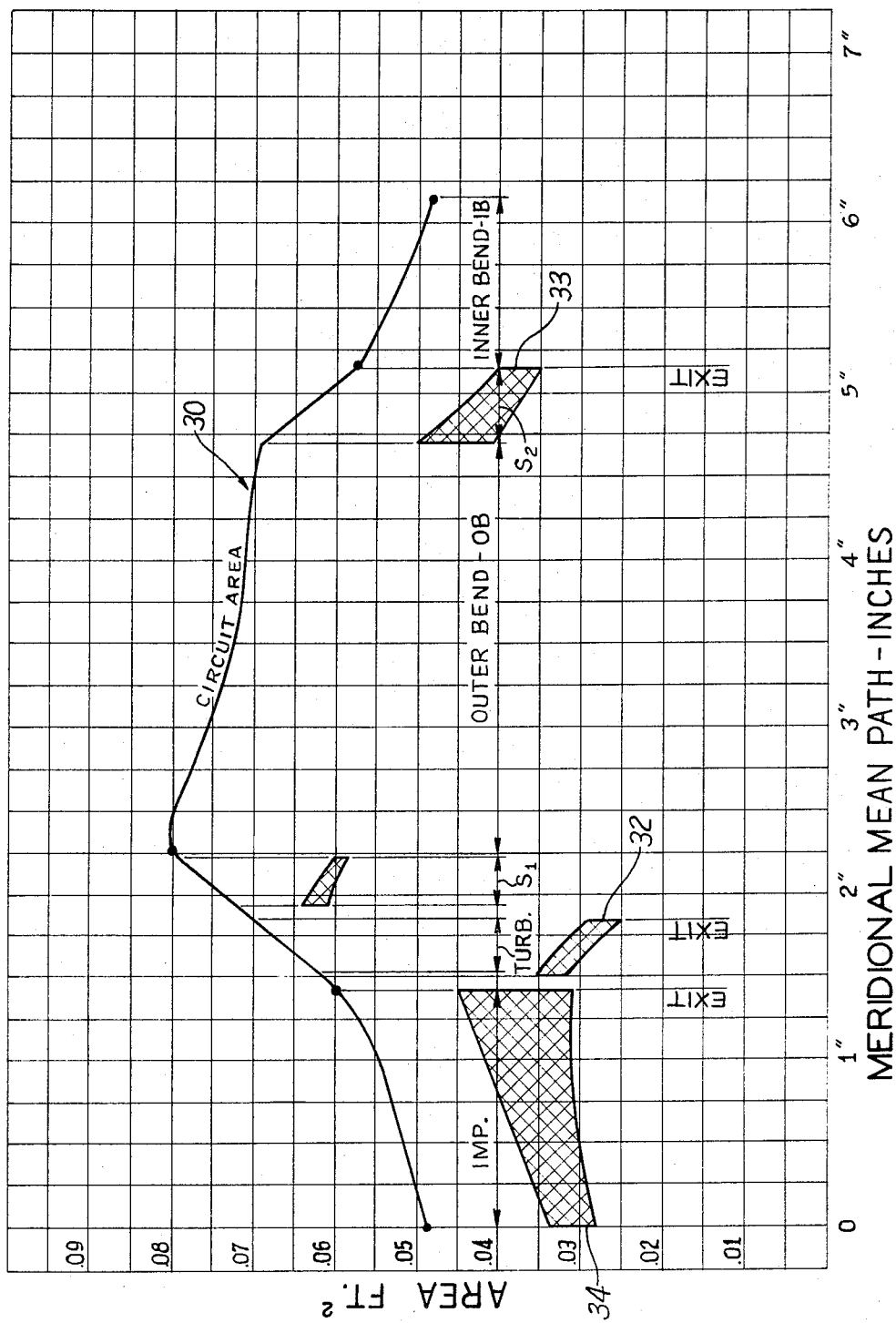
FIG. 5 is a graph showing the convergence of the cross sectional area of the outer ben d and of the inner bend of the converter path, and also showing the proportion between the preferred cross sectional bladed areas of each of the stages of the converter.

FIG. 5, curve 30, shows the continually converging nature of the cross sectional area of both the outer bend OB and the inner bend IB of the bladeless areas of the flow path of the converter. By having such continual convergence, the angle of entry to the stator SL and the turbine T can be maintained and the fluid will not separate from its known flow path.

The values of the numbers regarding the area and the mean path are chosen for illustrative purposes only and are for a given size converter and of course will vary for different sizes of converters. The graph does illustrate, however, the proportions preferred for various stages.

The shaded areas in FIG. 5 are the result of the aforementioned preferred exit angles and the continually converging areas of the outer and inner bends. These shaded areas represent the preferable limits of cross sectional areas used for various stages of the aerodynamic torque converter of the present invention. The shaded areas represent the desired cross sectional area of the stages, which areas are the true areas actually available to flow of fluid through the stages, taking into account the actual area of the blades themselves. It will be noted that the smallest area in the unit should be the turbine stage, as exemplified at 32. The final stator stage should have a fluid outlet area 33 greater than that of the turbine and equal to or greater than the impeller inlet area 34.

This arrangement provides that greatest momentum change occurs in the turbine and therefore, the turbine is the definition of flow in the converter. Such an arrangement results in higher stall torque ratios, high efficiencies, broadens the utility ratio of the converter, and gives lower runout speed ratios.

I claim:

1. An aerodynamic torque converter comprising, a non-rotatable housing, a power input shaft in said housing, an impeller wheel fixed to said input shaft for being rotationally drive thereby, said impeller wheel having a series of impeller blades which are inclined backwards with respect to the direction in which said wheel rotates, the exit angle of said impeller blades being between 20° and 45°, a turbine wheel having turbine blades and located at the discharge side of said impeller wheel for receiving air therefrom for being driven thereby, an output shaft in said housing, said turbine wheel being fixed to said output shaft, and a stator, at least the last stage of which, is located in the radially inflow side of the circuit of said converter and fixed to said housing, said stator having a series of stator blades which are inclined forwardly in respect to the direction of rotation of said wheels, the exit angle of said stator blades being in the range of 35° to 45°.

2. The aerodynamic torque converter as set out in claim 1 further characterized in that said turbine blades are inclined at an angle of between 55° to 75° in a radially outward and rearward direction in respect to the direction of rotation of said wheels.

3. The converter set forth in claim 1 wherein the converter has bladeless outer and inner bends, said bends are of continually converging cross sectional area.

4. The converter set forth in claim 2 wherein the converter has bladeless outer and inner bends, and said bends are of continually converging cross sectional area.

5. An aerodynamic torque converter comprising, a non-rotatable housing, a power input shaft in said housing, an impeller wheel fixed to said input shaft for being rotationally driven thereby, said impeller wheel having a series of impeller blades which are inclined radially outward and backwards with respect to the direction in which said wheel rotates, the exit angle of said impeller blades, as measured between their mean camber line and a radius line from the center of said wheel and extending through the exit end of said blades, being between 20° and 45°; a turbine wheel having turbine blades and located at the discharge side of said impeller wheel for receiving air therefrom for being driven thereby, an output shaft in said housing, said turbine wheel being fixed to said output shaft, and a stator, at least the last stage of which, is located in the radially inflow side of the circuit of said converter and fixed to said housing, said stator having a series of stator blades which are inclined radially outward and forward in respect to the direction of rotation of the impeller wheel; the exit angle of said stator blades, as measured between their mean camber line and a radius line from the center of said wheel and extending through the exit end of said blades, being in the range of 35° to 45°.

6. The aerodynamic torque converter as set out in claim 5 further characterized in that said turbine blades are inclined at an angle of between 55° to 75° in a radially outward and rearward direction in respect to the direction of rotation of said wheels.

7. The converter set forth in claim 5 wherein the converter has bladeless outer and inner bends, and said bends are of continually converging cross sectional area.

8. The converter set forth in claim 6 wherein the converter has bladeless outer and inner bends, and said bends are of continually converging cross sectional area.

9. An aerodynamic torque converter of the type having a non-rotatable housing, a bladed turbine, a bladed impeller, a bladed stator, a generally bladeless outer bend section between said turbine and said stator, and a bladeless inner bend section between the outlet of said stator and the inlet of said impeller, all of which together form a closed toroidal circuit through which air is circulated, said bladed stator being located at the radially inflow side of said circuit, the blades of said impeller being inclined backwardly with respect to the direction in which said impeller rotates, the exit angle of said impeller blades being between 20° and 45°, the blades of said stator being inclined forwardly with respect to the direction of rotation of said impeller and turbine, the exit angle of said stator blades being within the range of 35° to 45°.

10. The converter set forth in claim 9 wherein said outer and inner bend sections are of continually converging cross sectional area.

11. In combination, a gas turbine having a power output shaft, an aerodynamic torque converter having a non-rotatable housing, an impeller wheel fixed to said shaft for being rotationally driven thereby, said impeller wheel having a series of impeller blades which are inclined backwards with respect to the direction in which said wheel rotates, the exit angle of said impeller blades being between 20° and 45°, a turbine wheel having turbine blades and located at the discharge side of said impeller wheel for receiving air therefrom for being driven thereby, a converter output shaft in said housing, said turbine wheel being fixed to said converter shaft, and a stator located in the radially inflow side of the circuit of said converter and fixed to said housing, said stator having a series of stator blades which are inclined forwardly in respect to the direction of rotation of said wheels, the exit angle of said stator blades being in the range of 35° to 45°, and fluid conduit means between said gas turbine and said aerodynamic torque converter for delivering air to said converter.

12. The converter set forth in claim 11 wherein the converter has bladeless outer and inner bends, and said bends are of continually converging cross sectional area.

13. In combination, a gas turbine having a power output shaft, an aerodynamic torque converter having a non-rotatable housing, an impeller wheel fixed to said input shaft for being rotationally driven thereby, said impeller wheel having a series of impeller blades which are inclined radially outward and backwards with respect to the direction in which said wheel rotates; the exit angle of said impeller blades as measured between their mean camber line and a radius line from the center of said wheel and extending through the exit end of said blades being between 20° and 45°; a turbine wheel having turbine blades and located at the discharge side of said impeller wheel for receiving air therefrom for being driven thereby, a converter output shaft in said housing, said turbine wheel being fixed to said converter shaft, and a stator located in the radially inflow side of the circuit of said converter and fixed to said housing, said stator having a series of stator blades which are inclined radially outward and forward in respect to the direction of rotation of said wheels; the exit angle of said stator blades, as measured between their mean camber line and a radius line from the center of said wheel and extending through the exit end of said blades, being in the range of 35° to 45°, and fluid conduit means between said gas turbine and said aerodynamic torque converter for delivering air to said converter.

14. The converter set forth in claim 13 wherein the converter has bladeless outer and inner bends, and said bends are of continually converging cross sectional area.

* * * * *